United States Patent
Stoffel et al.

(10) Patent No.: US 10,648,051 B2
(45) Date of Patent: May 12, 2020

(54) RECIPROCATING CUTTING BLADE WITH CLADDING

(71) Applicants: Neal J. Stoffel, Campbellsport, WI (US); Keith A. Johnson, Kewaskum, WI (US)

(72) Inventors: Neal J. Stoffel, Campbellsport, WI (US); Keith A. Johnson, Kewaskum, WI (US)

(73) Assignee: Kondex Corporation, Lomira, WI (US)

( * ) Notice: Subject to any disclaimer, the term of this patent is extended or adjusted under 35 U.S.C. 154(b) by 630 days.

(21) Appl. No.: 15/057,740

(22) Filed: Mar. 1, 2016

(65) Prior Publication Data
US 2016/0309648 A1    Oct. 27, 2016

Related U.S. Application Data

(60) Provisional application No. 62/152,288, filed on Apr. 24, 2015.

(51) Int. Cl.
*A01D 34/13*    (2006.01)
*C21D 9/18*    (2006.01)
(Continued)

(52) U.S. Cl.
CPC ............ *C21D 9/18* (2013.01); *A01D 34/13* (2013.01); *B23K 26/0006* (2013.01); *B23K 26/08* (2013.01); *B23K 26/144* (2015.10); *B23K 26/1476* (2013.01); *B23K 26/34* (2013.01); *B23K 26/354* (2015.10); *C21D 1/18* (2013.01); *C21D 1/42* (2013.01); *B23K 2101/20* (2018.08);
(Continued)

(58) Field of Classification Search
USPC .................................................. 56/299, 298
See application file for complete search history.

(56) References Cited

U.S. PATENT DOCUMENTS

| 513,834 A | 1/1894 | Smith |
| 2,529,797 A | 11/1950 | Cauble |

(Continued)

FOREIGN PATENT DOCUMENTS

| AU | 562 997 B2 | 6/1987 |
| CN | 2917235 Y | 7/2007 |

(Continued)

OTHER PUBLICATIONS farmparts4less.com; John Deere Combine Sickle Sections; tungsten hard faced sickle sections; http://www.farmparts4less.com/see-whats-on-sale/sickle-sections/tungsten-hard-faced-sections/john-deere-combine-sickle-sections/; 2014; 2 pages.

(Continued)

*Primary Examiner* — Thomas B Will
*Assistant Examiner* — Mai T Nguyen
(74) *Attorney, Agent, or Firm* — Reinhart Boerner Van Deuren P.C.

(57) ABSTRACT

A sickle cutting section is provided. The sickle cutting section comprises a plate having a base material of a first hardness. The plate extends forwardly from a mounting portion to a front tip. A serrated cutting edge extends at least partially between the front tip and the mounting portion. A clad material is of a second hardness that is harder than the first hardness and is deposited along the base material at least partially along the serrated cutting edge.

23 Claims, 5 Drawing Sheets

(51) Int. Cl.
*C21D 1/42* (2006.01)
*C21D 1/18* (2006.01)
*B23K 26/14* (2014.01)
*B23K 26/144* (2014.01)
*B23K 26/354* (2014.01)
*B23K 26/00* (2014.01)
*B23K 26/08* (2014.01)
*B23K 26/34* (2014.01)
*B23K 101/20* (2006.01)
*B23K 103/04* (2006.01)

(52) U.S. Cl.
CPC ......... *B23K 2103/04* (2018.08); *Y02P 10/253* (2015.11)

(56) References Cited

U.S. PATENT DOCUMENTS

| | | | |
|---|---|---|---|
| 3,063,310 A | 11/1962 | Connoy | |
| 3,658,106 A | 4/1972 | Elsasser | |
| 3,664,103 A * | 5/1972 | McNair | A01D 34/13 56/298 |
| 3,745,869 A | 7/1973 | Ludwig | |
| 3,802,078 A | 4/1974 | Denes | |
| 3,859,865 A | 1/1975 | Conrad | |
| 3,871,836 A | 3/1975 | Polk et al. | |
| 3,882,579 A | 5/1975 | Peacock | |
| 3,937,317 A | 2/1976 | Fleury, Jr. | |
| 3,944,443 A | 3/1976 | Jones | |
| RE29,989 E | 5/1979 | Polk et al. | |
| 4,290,326 A | 9/1981 | Ibach et al. | |
| 4,304,978 A | 12/1981 | Saunders | |
| 4,416,656 A | 11/1983 | Shapiro | |
| 4,451,302 A | 5/1984 | Prescott et al. | |
| 4,466,533 A | 8/1984 | Shwayder | |
| 4,516,302 A | 5/1985 | Chulada et al. | |
| 4,530,204 A | 7/1985 | Brooks | |
| 4,645,404 A | 2/1987 | Juravic | |
| 4,660,361 A | 4/1987 | Remillard et al. | |
| 4,666,033 A | 5/1987 | Reid | |
| 4,842,126 A | 6/1989 | McConnell | |
| 4,909,026 A | 3/1990 | Molzahn et al. | |
| 4,949,836 A | 8/1990 | Schostek | |
| 5,016,747 A | 5/1991 | Veenhof | |
| 5,092,453 A | 3/1992 | Bruke | |
| 5,181,461 A | 1/1993 | Viaud | |
| 5,209,053 A | 5/1993 | Verbeek | |
| 5,213,202 A | 5/1993 | Arnold | |
| 5,444,969 A | 8/1995 | Wagstaff et al. | |
| 5,673,618 A | 10/1997 | Little | |
| 5,823,449 A | 10/1998 | Kooima et al. | |
| 5,837,960 A * | 11/1998 | Lewis | B23K 26/34 219/121.63 |
| 5,845,474 A | 12/1998 | Loftus | |
| 5,906,053 A | 5/1999 | Turner et al. | |
| 6,089,334 A | 7/2000 | Watts | |
| 6,155,705 A | 12/2000 | Douris et al. | |
| 6,402,438 B1 | 6/2002 | Boyer | |
| 6,533,105 B1 | 3/2003 | Dutschke | |
| 6,543,211 B1 | 4/2003 | Talbot | |
| 6,594,975 B2 | 7/2003 | Anstey et al. | |
| 6,623,876 B1 | 9/2003 | Caron | |
| 6,857,255 B1 | 2/2005 | Wilkey et al. | |
| 6,886,317 B2 | 5/2005 | Jackson et al. | |
| 6,887,586 B2 | 5/2005 | Peker et al. | |
| 6,962,040 B2 | 11/2005 | Talbot | |
| 6,978,532 B1 * | 12/2005 | Merritt | B23P 15/40 29/417 |
| 7,451,678 B2 | 11/2008 | Dion et al. | |
| 7,478,522 B1 | 1/2009 | Lovett et al. | |
| 7,503,162 B2 | 3/2009 | Herlyn et al. | |
| 7,677,843 B2 | 3/2010 | Techel et al. | |
| 7,827,883 B1 | 11/2010 | Cherng et al. | |
| 8,096,221 B2 | 1/2012 | Tarrerias | |
| 8,109,176 B1 | 2/2012 | Kooima | |
| 8,353,148 B2 | 1/2013 | Derscheid | |
| 8,371,096 B2 | 2/2013 | Johnson et al. | |
| 8,464,506 B2 | 6/2013 | Schumacher et al. | |
| 8,484,938 B2 | 7/2013 | Cormier et al. | |
| 8,505,414 B2 * | 8/2013 | Culf | B23D 65/00 76/101.1 |
| 8,579,774 B2 | 11/2013 | Derscheid | |
| 8,662,131 B2 | 3/2014 | Cormier et al. | |
| 8,662,132 B2 | 3/2014 | Cormier et al. | |
| 8,769,833 B2 * | 7/2014 | Culf | B23P 15/40 30/346.54 |
| 8,893,462 B2 | 11/2014 | Talbot | |
| 9,038,359 B2 | 5/2015 | Augustine et al. | |
| 2001/0004826 A1 | 6/2001 | Neuerburg | |
| 2002/0131328 A1 | 9/2002 | Bowens et al. | |
| 2002/0136083 A1 | 9/2002 | Haberer | |
| 2003/0066391 A1 | 4/2003 | Griffo et al. | |
| 2003/0101706 A1 | 6/2003 | Kenny | |
| 2005/0241440 A1 | 11/2005 | Beck | |
| 2006/0168933 A1 | 8/2006 | Hill, Jr. | |
| 2007/0163128 A1 | 7/2007 | Tarrerias | |
| 2007/0261867 A1 | 11/2007 | Techel et al. | |
| 2008/0000210 A1 | 1/2008 | Jolly | |
| 2008/0006016 A1 | 1/2008 | Snider et al. | |
| 2008/0034567 A1 | 2/2008 | Galbreath et al. | |
| 2008/0078656 A1 | 4/2008 | Rhodea et al. | |
| 2009/0095214 A1 | 4/2009 | Whitfield | |
| 2009/0322143 A1 | 12/2009 | Krauter | |
| 2011/0009251 A1 | 1/2011 | Derscheid | |
| 2011/0067374 A1 | 3/2011 | James et al. | |
| 2011/0155027 A1 | 6/2011 | Waldner | |
| 2012/0060379 A1 | 3/2012 | Culf | |
| 2012/0063871 A1 | 3/2012 | Wood | |
| 2012/0079728 A1 | 4/2012 | Sjöholm | |
| 2012/0164927 A1 * | 6/2012 | Suh | B22F 3/115 451/540 |
| 2012/0233974 A1 | 9/2012 | Cormier et al. | |
| 2013/0032047 A1 | 2/2013 | Marques et al. | |
| 2013/0068735 A1 * | 3/2013 | Morisada | B23K 20/122 219/121.64 |
| 2013/0111863 A1 | 5/2013 | Johnson et al. | |
| 2013/0186053 A1 | 7/2013 | Talbot | |
| 2013/0233145 A1 | 9/2013 | Sotelo et al. | |
| 2014/0041537 A1 | 2/2014 | Hubach et al. | |
| 2014/0045562 A1 | 2/2014 | Adamczyk et al. | |
| 2014/0130473 A1 * | 5/2014 | Augustine | A01D 34/73 56/16.7 |
| 2014/0215787 A1 | 8/2014 | Wada et al. | |
| 2014/0248512 A1 * | 9/2014 | Kamel | C23C 28/021 428/686 |
| 2014/0373501 A1 | 12/2014 | McLawhorn et al. | |
| 2015/0017394 A1 * | 1/2015 | Johnson | B65G 33/265 198/676 |
| 2015/0033561 A1 * | 2/2015 | Bruck | F01D 5/147 29/889.71 |
| 2015/0217414 A1 * | 8/2015 | Luick | B23P 6/00 428/213 |
| 2015/0319922 A1 | 11/2015 | Stoffel et al. | |
| 2015/0319923 A1 | 11/2015 | Stoffel et al. | |
| 2016/0157423 A1 * | 6/2016 | Stoffel | A01F 29/09 148/525 |
| 2016/0360695 A1 | 12/2016 | Klackensjö | |

FOREIGN PATENT DOCUMENTS

| | | |
|---|---|---|
| CN | 102265739 A | 12/2011 |
| CN | 203091870 U | 7/2013 |
| CN | 103668177 A | 3/2014 |
| DE | 20 2010 007 393 U1 | 9/2010 |
| EP | 0462484 A2 | 12/1991 |
| EP | 2 200 914 | 3/2009 |
| EP | 2 371 205 B1 | 10/2011 |
| EP | 2 499 896 A1 | 9/2012 |
| GB | 2 149 292 A | 6/1985 |
| GB | 2 176 683 A | 1/1987 |
| JP | 7-24986 | 6/1995 |
| JP | 3382730 B2 | 3/2003 |
| JP | 2006020531 A | 1/2006 |

(56) References Cited

FOREIGN PATENT DOCUMENTS

| JP | 2009011223 A | 1/2009 |
|----|----|----|
| JP | 2009126608 A | 6/2009 |
| RU | 2555268 C2 | 7/2015 |
| WO | WO 90/14755 A1 | 12/1990 |
| WO | WO 2013/106560 A1 | 7/2013 |

OTHER PUBLICATIONS

Herschel; S20-3521P Heavy Top Serrated Super 7 Mini Section; http://www.herschelparts.com/aspx/prodDetail.aspx?id=1296; 2014; 3 pages.

Farm Show; Tungsten steel sickle sections catch on fast; www.farmshow.com/a_article.php?aid=9660; Farm Show magazine article; 1986, 4 pages.

Harvesting Equipment—Blades for Agricultural Rotary Mowers—Requirements; International Standard ISO 5718; Jul. 15, 2002; 10 pages; First edition; Geneva, Switzerland.

Hyungson Ki et al.; Process map for laser heat treatment of carbon steels; Optics & Laser Technology; 2012, 9 pages (2106-2114) vol. 44.

Sangwoo So et al.; Effect of specimen thickness on heat treatability in laser transformation hardening; International Journal of Heat and Mass Transfer; 2013; 11 pages (266-276); vol. 61.

R. Vilar, Laser cladding, Journal of Laser Applications, vol. 11, No. 2, Apr. 1, 1999, pp. 64-79.

\* cited by examiner

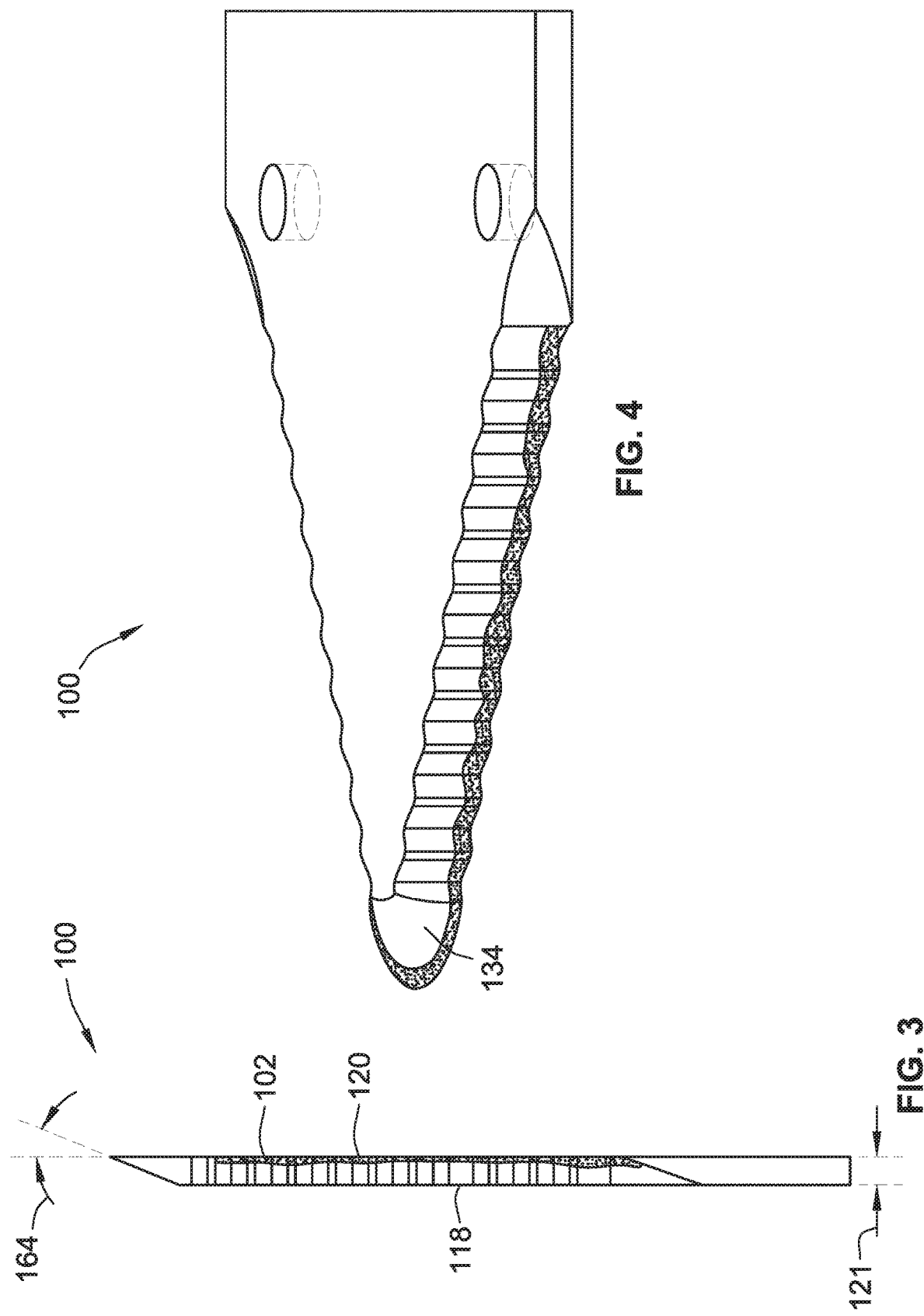

RECIPROCATING CUTTING BLADE WITH CLADDING

CROSS-REFERENCE TO RELATED PATENT APPLICATIONS

This patent application claims the benefit of U.S. Provisional Patent Application No. 62/152,288, filed Apr. 24, 2015, the entire teachings and disclosure of which are incorporated herein by reference thereto.

FIELD OF THE INVENTION

This invention generally relates to reciprocating cutting blades.

BACKGROUND OF THE INVENTION

Sickle bar assemblies are used on agricultural equipment to cut crops. The assemblies in general include reciprocating cutting blades, also known as sickle sections that are attached to a metal bar commonly referred to as a knife back and move in a reciprocating motion over knife guards of the sickle bar assembly to cut crops. Examples of such sickle bar assembly systems may be seen in U.S. Pat. No. 8,371,096.

Thus, the reciprocating cutting blades function as one half of the cutting system, the other half being the sickle guards which the sickle sections cut against to form a scissor type of cutting action. The sickle/guard process of cutting crop has been around for over 150 years in various forms. Over the years attempts have been made to improve these particular components that make up the cutting systems through use of various materials and heat treatments in attempts to improve wear, efficiency, and cost of production.

In the efforts to improve cutting blade cutting efficiency, there has been some work on the design of the serrations on the sickle section in the past 40 years so as to help direct the crop stems to the root of the serration tooth. This has been shown to cause a self-sharpening effect as the blade is moving from left to right in use. At this point in time, this is the state of the art for all major agricultural equipment manufacturers. However, the wear life of this cutting system is not adequate. More specifically, the cutting edges of these sickle sections dull fairly quickly which in turn causes the load on the sickle to increase dramatically and thereby lead to more fuel usage and breakage of the sickle.

One attempt to help increase the cutting edge retention of the modern sickle section was developed around midcentury and it included the use of hard chrome plating on the entire sickle section. This hard chrome plating was fairly well accepted but alas the cost to plate the entire sickle section became prohibitive, and more recently, the environmental impact of chrome plating has made this approach obsolete.

In the middle 1980's a Kansas manufacturer introduced a "Tungsten Steel Sickle Section" touting a tungsten carbide hard-facing applied to the top of the serrations. The present inventor contemplates that a problem with this design is that the serrations could not fully accept the hard-facing and thus the wear resistance was still a problem. This product was only on the market a few years because the cost of the hard-facing was not worth the increased product life that was claimed.

Most recently, U.S. Pat. No. 6,857,255 disclosed a sickle section with laser hardened cutting edges. In the '255 patent, the cutting edges are quench and tempered to 40-58 Rc to remain fairly tough and then a secondary laser heat treating operation is applied to the very tips of the serrations of the cutting edge in the range of 64-68 Rc hardness. Unfortunately, this design results in the cutting edge having such a high hardness that it is extremely brittle and the teeth of the serrations may break off within minutes of operation leaving a dull cutting edge.

Lastly, as sickle sections are designed today, the present inventor contemplates that the forward facing tip of the reciprocating cutting blade can be a deterrent in allowing crop to enter the cutting zone comprising the cutting edges of the cutting system, because as the tips encounter the stalk of crop, the blunt impact merely knocks the crop down and does not allow for the crop to efficiently move as desired into the cutting edges. For this reason, the inventor further contemplates that the sickle sections are typically designed with a small width tip, however, such small tips are problematic because the smaller the tip gets the less strength it has to endure crop cutting and other obstacles in the field; the smaller the tip, the less effect it has on allowing crop into the cutting zone but, the more likely it is to break.

Different aspects of the invention seeks to address one or more of the foregoing limitations found by the present inventor in reciprocating cutting blades of sickle bar assemblies. These and other advantages of the invention, as well as additional inventive features, will be apparent from the description of the invention provided herein.

BRIEF SUMMARY OF THE INVENTION

In one aspect, the invention provides a sickle cutting section that includes a plate having a base material of a first hardness. The plate extends forwardly from a mounting portion to a front tip. A serrated cutting edge extends at least partially between the front tip and the mounting portion. A clad material of a second hardness is harder than the first hardness. The clad material is deposited along the base material at least partially along the serrated cutting edge.

In another aspect, the invention provides a sickle cutting section that includes a plate comprising a base material having a first hardness. The plate extends forwardly from a mounting portion to a frontal tip. A serrated cutting edge extends at least partially between the frontal tip and the mounting portion. The plate includes a top surface and a bottom surface. A plate thickness is defined between the top surface and the bottom surface. A wedge portion extends toward the tip from the mounting portion. The serrated cutting edge includes a first serrated cutting edge along a first side of the wedge and a second serrated cutting edge along a second side of the wedge. The serrated cutting edge is formed along the bottom surface and extends along a tapered surface. The tapered cutting surface extends inwardly from the bottom surface to the top surface. The bottom surface provides a bearing surface suitable for supporting linear reciprocating movement. The tapered surface extends along the frontal tip. The frontal tip may be rounded and may form a non-serrated cutting edge or serrated cutting edge that connects the first and second serrated cutting edges to form an overall continuous cutting edge around wedge.

In yet another aspect, the invention provides a sickle cutting section. The sickle cutting section includes a sickle plate that comprises a base material having a first hardness. The sickle plate extends forwardly from a mounting portion to a front tip. A serrated cutting edge extends at least partially between the front tip and the mounting portion. Particles of a second hardness are harder than the first hardness. The particles may be deposited into the base material in a melt pool portion of the base material and may extend at least partially along the serrated cutting edge.

In an embodiment, the clad material may be deposited into the base material forming a melt pool of the clad material and base material. At solidification the melt pool includes a dilution zone comprising a portion of base material intermixed with particles of the clad material.

The dilution zone may be less than 0.06 mm thick and more preferably less than 0.13 mm. A deposition zone comprising particles of the clad material clad particles may be formed over of the dilution zone. This may better maintain integrity of the base material without melting too much material that could otherwise compromise the edge.

In an embodiment, the clad material may comprise particles having an average size of between 40 and 250 µm and more preferably between 44 and 105 µm.

In an embodiment, the clad material may form a bead having an average thickness of between 0.1 and 0.4 millimeter and more preferably between 0.2 and 0.3 millimeter. The bead may extend normal to a surface of the base material. The plate may have a plate thickness of between 1 and 5 millimeters and more preferably between 2 and 4 millimeters.

In an embodiment, the serrated cutting edge may have a plurality of serrations defining a plurality recesses and tips. The recesses may be disposed between adjacent tips. Eight or fewer serrations per 2.5 centimeters may be provided as the serrated cutting edges extend from the mounting portion toward the front tip.

In an embodiment six or fewer serrations per 2.5 centimeters may be provided. The clad material may form a bead having an average thickness of between 0.2 and 0.3 millimeters that extends normal to a surface of the base material. The plate may have a plate thickness of between 1 and 5 millimeters.

In an embodiment, the recesses may extend greater than 3 millimeters between adjacent tips and have a radius of curvature that is greater than 0.13 cm and more preferably between 0.20 cm and 0.30 cm.

In these embodiments above and with these sizes or ranges or combinations thereof, sufficient coverage can be obtained while limiting obstruction of the serrations.

In an embodiment, each of the tips may comprise a flattened region and extend between adjacent recesses at least 1.0 millimeter and preferably at least 0.5 millimeter.

In a typical embodiment for agricultural applications, the plate may comprise a top surface and a bottom surface. A plate thickness is defined between the top surface and the bottom surface. A wedge portion may extend toward the front tip from the mounting portion. The serrated cutting edge may include a first serrated cutting edge along a first side of the wedge portion and a second serrated cutting edge along a second side of the wedge portion. The serrated cutting edge may be formed along the bottom surface and extend along a tapered surface. The tapered surface extends inwardly from the bottom surface to the top surface. The bottom surface may provide a bearing surface suitable for supporting linear reciprocating movement. The clad material may be deposited along the tapered surface.

The bottom surface may be free of the clad material. The clad material may be in the form of a bead that extends along a limited portion of the tapered surface. The tapered surface may comprise a region free of the clad material at a location between the bead and the top surface.

The clad material may comprise a laid bead of laser cladding. The laid bead may be comprised of at least one of the following materials: tungsten carbide, titanium carbide, iron carbide, diamond, ceramic, and other material having a Vickers scale hardness between HV 1200-2500.

The tapered surface may extend along the frontal tip. The frontal tip may be rounded and form a cutting edge that connects the first and second serrated cutting edges to form an overall continuous cutting edge around the wedge portion. The clad material may be deposited on the frontal tip and be continuous around the overall continuous cutting edge.

The sickle cutting section may have a first lateral dimension of between 6.4 and 8.9 centimeters, a second lateral dimension of between 6.4 and 8.9 cm, and a thickness of between 2 and 5 millimeters. The sickle sections may be attached to a knife back and reciprocate within knife guards. The bearing surface may bear against the knife guards and wherein the clad material does not bear against the knife guards.

In an embodiment, the frontal tip may define a continuous curvature having a radius of curvature of between 0.7 and 1.8 centimeters.

In an embodiment, the frontal tip forms a serrated cutting edge.

In another embodiment, the frontal tip forms a non-serrated cutting edge.

In an embodiment, the tapered surface forms an angle with the bottom surface that is between 21 and 25 degrees.

In such embodiments, the sickle can have a material bead of second hardness that is harder than the first hardness. The material bead may extend continuously around the first serrated cutting edge, the non-serrated cutting edge and the second serrated cutting edge.

In an embodiment, the particles deposited into the base material in the melt pool solidify to form a metallurgical bond with the base material in a dilution zone.

In a more detailed embodiment, the dilution zone is under a deposition zone comprised of a laser clad bead. The laser clad bead may have a width of between 2.5 and 5 mm that extends at least partially from a bottom surface of the serrated cutting edge inwardly toward a top surface of the serrated cutting edge.

Another aspect of the invention provides a method of making the sickle cutting section. The method includes, melting the base material with a laser to form a melt pool; depositing a stream of particles of the clad material into the melt pool; and solidifying the melt pool to affix the particles of the clad material.

In an embodiment, the method may further include induction hardening of the serrated cutting.

In still another embodiment, the method may include quenching and tempering the sickle cutting section.

In yet another embodiment, the method may include austempering the sickle cutting section.

In another aspect, the invention provides a sickle cutting section that includes a plate comprising a base material having a first hardness. The plate extends forwardly from a mounting portion to a front tip. A serrated cutting edge extends at least partially between the front tip and the mounting portion. The serrated cutting edge comprises a plurality of serrations defining a plurality recesses and tips. The recesses are disposed between adjacent tips. Eight (8) or fewer serrations per 2.5 cm are provided as the serrated cutting edges extend from the mounting portion toward the front tip. The recesses extend greater than 3 millimeters between adjacent tips and have a radius of curvature that is greater than 0.13 cm.

In an embodiment, the sickle cutting section comprises a hardened layer applied at least partially to the serrations. The hardened layer has a second hardness greater than the first hardness.

In a more detailed embodiment, the sickle cutting section may have 6 or fewer serrations per 2.5 cm provided. The hardened layer comprises a bead having an average thickness of between 0.2 and 0.3 millimeter and extends normal to a surface of the base material. The plate comprises a plate thickness of between 2 and 4 millimeters.

In an embodiment, the sickle cutting section may have a radius of curvature is between 0.20 cm and 0.030 cm.

In another embodiment, the hardened layer comprises particles having an average size of between 44 and 105 μm. The particles are deposited into the based material with a dilution zone comprised of a mixture of particles and the base material. The dilution zone is less than 0.06 mm thick. The particles comprise at least one of the following materials: tungsten carbide, titanium carbide, iron carbide, diamond, ceramic, and other material having a Vickers scale hardness between HV 1200-2500.

In yet another embodiment, the plate comprises a top surface, a bottom surface, with a plate thickness defined between the top surface and the bottom surface. A wedge portion extends toward the front tip from the mounting portion. The serrated cutting edge includes a first serrated cutting edge along a first side of the wedge portion and a second serrated cutting edge along a second side of the wedge portion. The serrated cutting edge is formed along the bottom surface and extends along a tapered surface. The tapered surface extends inwardly from the bottom surface to the top surface. The bottom surface provides a bearing surface suitable for supporting linear reciprocating movement.

In another embodiment, a clad material is deposited along the tapered surface.

In another embodiment, the bottom surface is free of the clad material.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings:

FIG. 3 is a side view of the laser clad sickle section of FIG. 2.

FIG. 4 is a left side elevated perspective view of the sickle section of FIG. 2.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
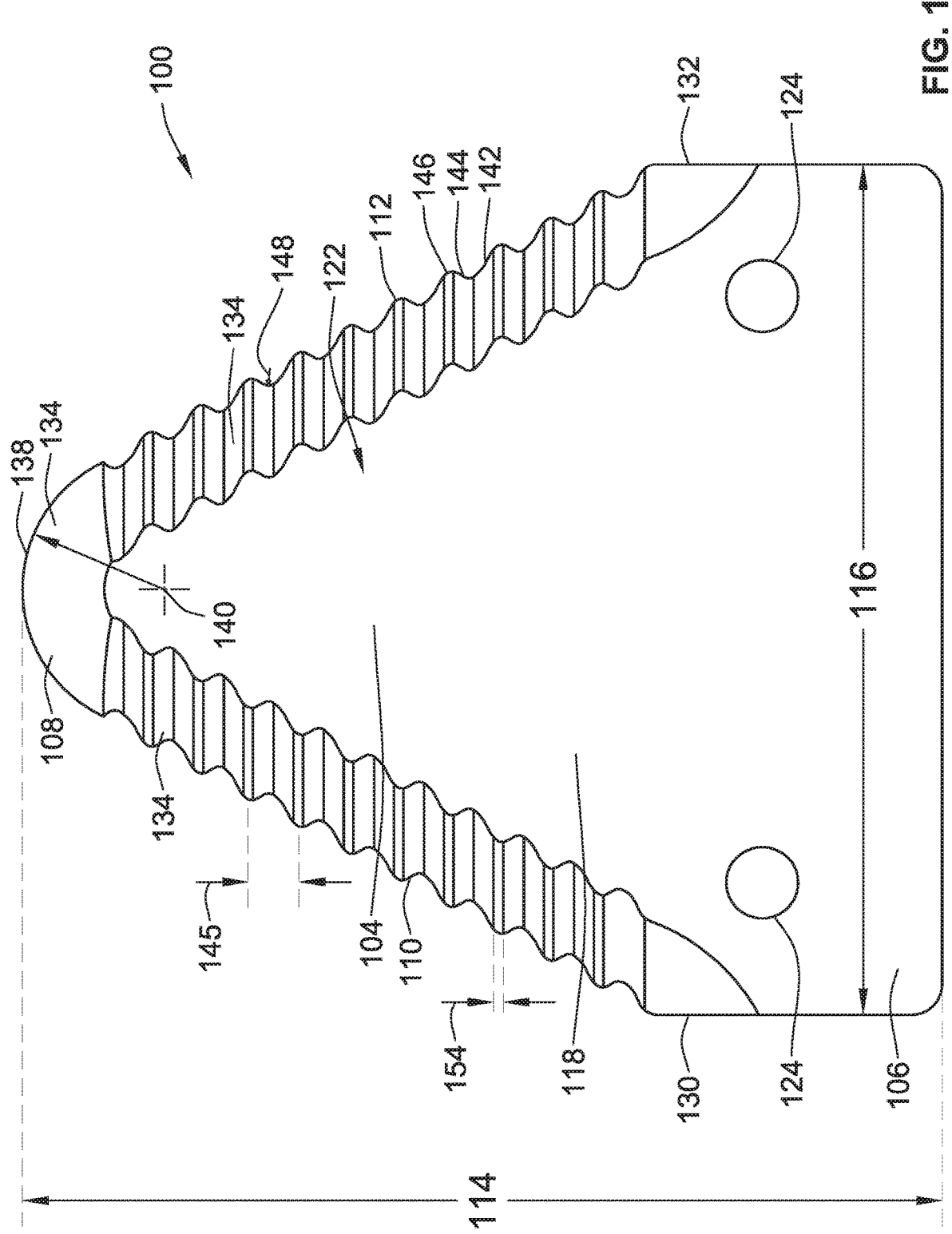
FIG. 1 is a top view of an unclad sickle section according to an embodiment of the present invention.

FIG. 1 illustrates a sickle cutting section 100 (also referred to as a reciprocating cutting blade) of an embodiment of the present invention prior to the application of a clad material 102.

The sickle cutting section 100, includes a plate 104 comprised of a base material having a first hardness. The plate 104 extends forwardly from a mounting portion 106 to a front tip 108. A serrated cutting edge 110, 112 extends at least partially between the front tip 108 and the mounting portion 106. Preferably, the sickle cutting section 100 has a first lateral dimension 114 of between 6.3 and 8.9 centimeters and a second lateral dimension 116 of between 6.3 and 8.9 centimeters. This makes the blade suitable for agricultural applications such as sickle bar assemblies.

Figure 5:
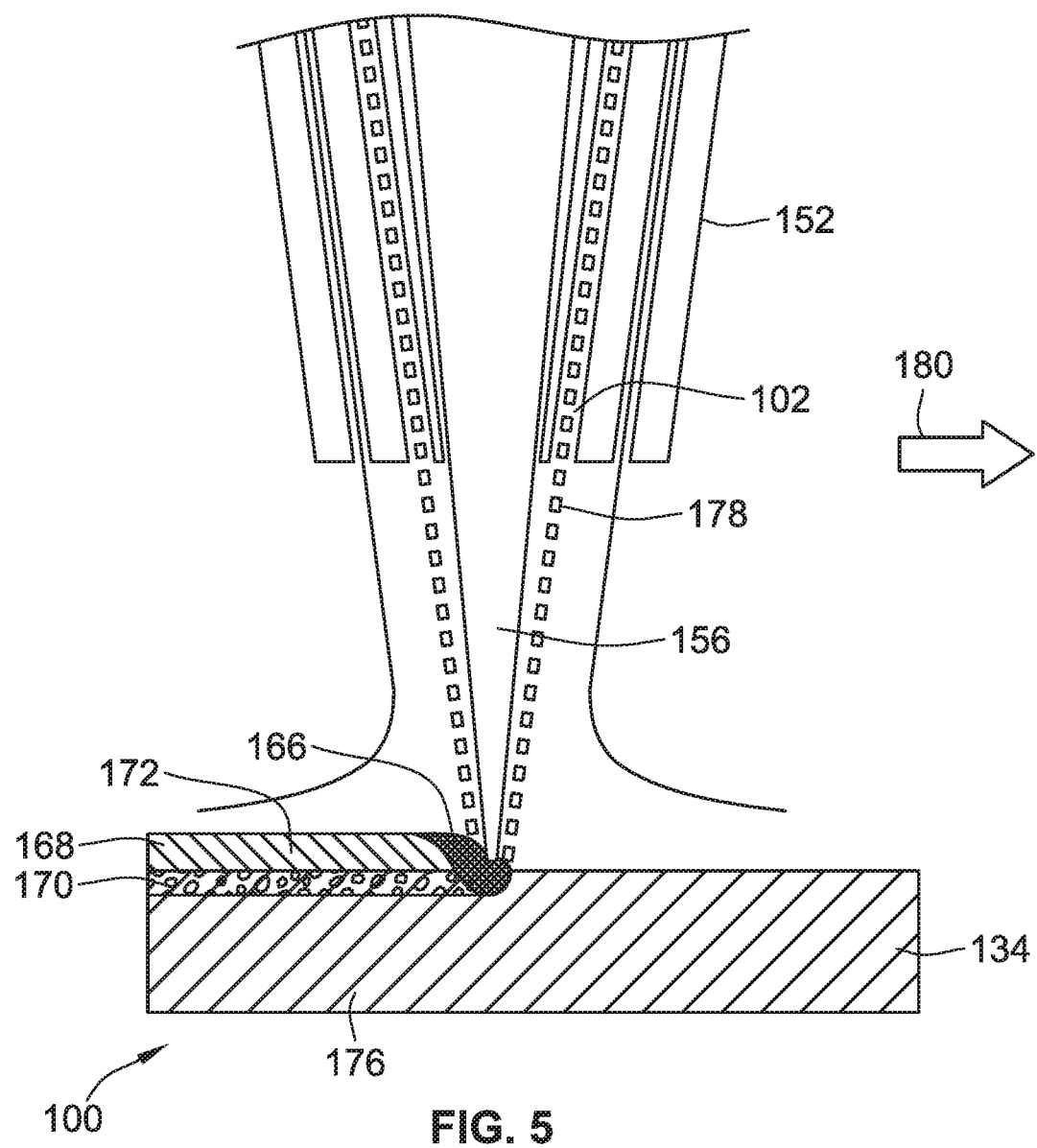
FIG. 5 is an exaggerated schematic cross section taken through the cladded tip of the serrated edge of the laser clad sickle section of FIG. 2 and further schematically illustrates the cladding tool used to create the structures created in and on the sickle section as a result of the cladding process.

The plate 104 is comprised of a top surface 118 and a bottom surface 120. A plate thickness 121 (FIG. 3) is defined between the top surface 118 and the bottom surface 120. Preferably, the plate thickness 116 is between 1 and 5 millimeters and more preferably between 2 and 5 millimeters (also thereby suitable for the typical agricultural application). A wedge portion 122 extends toward the front tip 108 from the mounting portion 106. The mounting portion 106 includes at least one mounting aperture 124, and in the embodiment illustrated, two mounting apertures 124 that pass through the top 118 and bottom 120 surfaces of the plate 104 so as to provide for fastening the sickle cutting section 100 to a knife back 126 of a sickle back assembly 128. (FIG. 5)

The serrated cutting edge 110,112 includes a first serrated cutting edge 110 along a first side 130 of the wedge portion 122 and a second serrated cutting edge 112 along a second side 132 of the wedge portion 122. The serrated cutting edge 110, 112 is formed along the bottom surface 120 and extends along a tapered surface 134. The tapered surface 134 extends inwardly from the bottom surface 120 to the top surface 118. The bottom surface 120 provides a bearing surface that is typically flat and smooth and suitable for supporting the linear reciprocating movement of the sickle section 100 over knife guards of the sickle back assembly 128. (FIG. 5).

The tapered surface 134 extends along the frontal tip 108. The frontal tip 108 is rounded and forms a cutting edge 138 that may be a non-serrated cutting edge or may be a serrated cutting edge (not shown) that connects the first and second serrated cutting edges 110, 112 to form an overall continuous cutting edge 110, 112, 138 around the wedge portion 122. Preferably, the frontal tip 108 may define a continuous curvature having a radius of curvature 140 of between 0.3 and 0.7 inches.

The wide and rounded front tip 108 has several advantages. The front tip 108 configuration permits the formation of the tapered cutting surface 134 to extend between the serrated cutting edges 110, 112. Further, the front tip 108 allows for the clad material 102 to be uniformly deposited onto the cutting edge 138 that may be either a serrated cutting edge or non-serrated cutting edge. Additionally, the wide rounded front tip 108 with cutting edge 138 on the tapered surface 134 permits the crop it encounters in the field to be cut as opposed to merely being knocked down by a pointed or dull tip. Thus, the cutting efficiency of the sickle sections 100 with this front tip is increased by having the cutting edge 138 but also by having a broader surface area that can more fully withstand crop impact, particularly when considered in relation to front tips that are pointed i.e. have very narrow impact surfaces susceptible to breaking or front tips having dull points that merely knock down the crop before it can enter move to the cutting edges of the sickle sections.

Each of the serrated cutting edges 110, 112 and in embodiments where the cutting edge 138 of the front tip 108 is serrated comprise a plurality of serrations 142 in a nearly sinusoidal pattern having a frequency that defines a plurality recesses 144 and tips 146. Each recess 144 is disposed between adjacent tips 146. Preferably the frequency of the serrations is eight (8) or fewer serrations per 2.5 centimeters as the serrated cutting edges 110, 112 extend from the mounting portion 106 toward the front tip 108 and around the front tip in embodiments where cutting edge 138 is serrated. More preferably six (6) or fewer serrations per 2.5 centimeters are provided as the serrated cutting edges 110, 112 extend from the mounting portion 106 toward the front tip 108 and around the front tip in embodiments where cutting edge 138 is serrated.

Preferably, the recesses 144 have a recess width 145 greater than 3 millimeters between adjacent tips 146 and have a radius of curvature 148 that is greater than 0.13 cm and more preferably between 0.2 cm and 0.03 cm. Each of the tips 146 comprises a flattened region that preferably have a tip width 154 that extends between adjacent recesses 144 at least 1.0 millimeter, and more preferably at least 0.5 millimeter. The flattened tips are advantageous in that they permit material to be melted during laser cladding while still maintaining points (sharper tips may otherwise be undesirably melted and deformed during melting) for the serrations.

The radius of curvature 148 of the recesses 144 provide for a wide recess 144 within each of the serrations 142 that together with the flattened region 154 of each serration 142 provide the necessary advantageous configuration for the clad material 102 to be applied more uniformly from the recesses 144 to the tips 146 of the serrations 142. In other words, if the frequency of the serrations was too short and thus the radius of curvature of the recess 148 was too small, there may not be ample space for a cladding tool 152 to uniformly deposit the clad material 102 adequately to the narrow recess and steep sides of the serrations of such a configuration. Or, alternatively, the cladding would overly obstruct the serrations and fill in the serrations almost completely or to an undesired extent.

The nearly pentagonal form of the plate 104 is typically made by stamping while the mounting apertures 124, tapered surface 134 of the cutting edges 110, 112, 138 rounded front tip 108, and serrations 142 of the cutting edges 110, 112, 138 are further formed or finished by various finishing operations. The sickle section 100 is typically made of steel.

Figure 2:
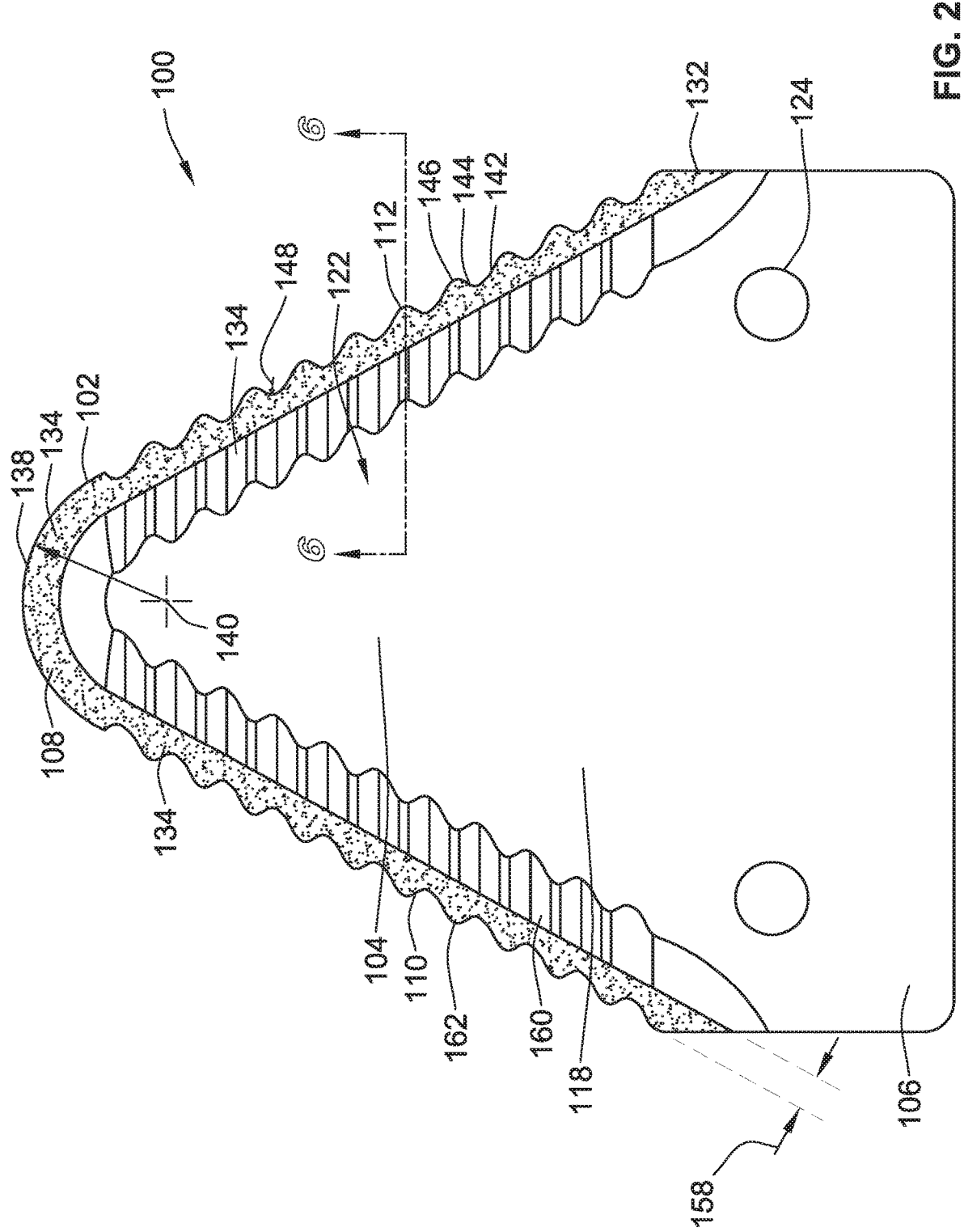
FIG. 2 is a top view of the sickle section of FIG. 1 with laser clad according to another embodiment of the present invention.

Turning to FIG. 2, the sickle section 100 of FIG. 1 is illustrated after the clad material 102 has been applied. The clad material 102 is of a second hardness that is harder than the first hardness. The clad material 102 is deposited along the base material at least partially along the tapered surface 134 of the serrated cutting edges 110, 112, and cutting edge 138 that may be serrated or non-serrated. Thus, the clad material 102 is deposited on the frontal tip 108 and is continuous around the overall continuous cutting edge 110, 112, 138. Preferably the taper surface width 150 is between 2 and 6 millimeters and more preferably between 3 and 4 millimeters.

Preferably, the width 158 of the clad material that extends along the tapered surface 134 is between 1 and 6 millimeters. More preferably, the clad width 158 is between 2.5 and 5 millimeters.

Thus, there may exist a free tapered surface portion 160 the tapered surface 134 is free of the clad material 102 and a cladded portion 162 of the tapered surface 134. Further, the bottom surface 120 may be entirely free of the clad material 102. This configuration advantageously provides for the necessary increased wear resistance of the cutting edge 100, 112, 138 and cutting efficiency while saving in material costs by having portions of the tapered surface 134, top surface 118 and the entire bottom surface 120 free of the clad material 102. Further, the bearing surface can be maintained with one material. Also, the base material under the cladding may wear first or more quickly maintaining sharpness with the clad bead.

FIG. 3 illustrates the plate thickness 121 as well as the angle 164 of the tapered surface 134 as measured from the bottom surface 120 to the tapered surface 134. Preferably the angle 164 is between 21 and 25 degrees and more preferably between 22 and 24 degrees. The angle 164 provides the advantage of accommodating the sinusoidal cutting edges 110, 112 and cutting edge 138 that may be serrated or non-serrated. Additionally, the angle 164 provides the advantage of permitting the efficient reception of the clad material 102 from the cladding tool 152, and still further provides for an efficient cutting edge 138 for cutting a crop at impact.

FIG. 4 illustrates a perspective view of the sickle section 100 and better illustrates the continuous cutting edge 110, 112, 138, tapered surface 134, and the angle 164 at the front tip 108.

Figure 6:
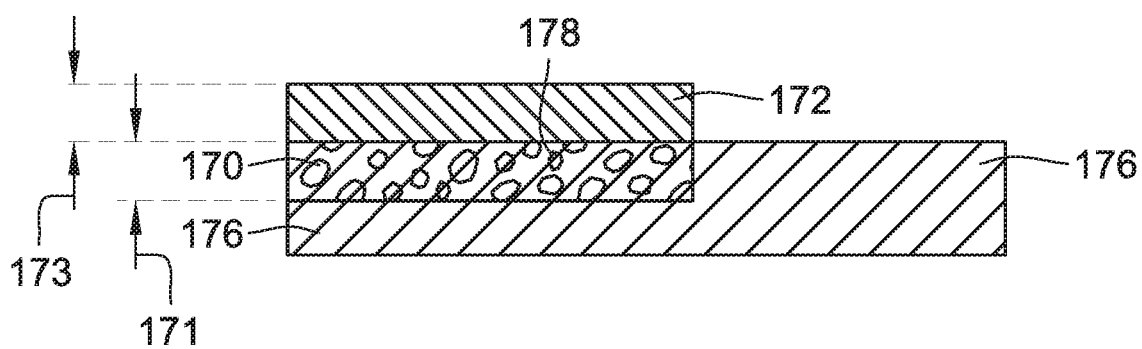
FIG. 6 is a cross section of a flattened tip of a serration of the sickle section of FIG. 2.

Turning now to FIGS. 5 and 6, FIG. 5, schematically illustrates the laser cladding method of certain embodiments of the invention and its effect during the laser cladding process on the base material 176 about the tapered surface 134 of the cutting edges 110, 112, 138. Specifically, the cross sectional area shown in FIG. 5 is that area taken through a flattened tip 146 of a serration 144. FIG. 6 illustrates the structures remaining within and on the base material after the laser clad material 102 has been deposited.

In general, laser cladding is the process of cladding material with the desired properties and fusing it onto the substrate by means of a laser beam. Laser cladding can yield surface layers that when compared to other hard facing techniques or standard blade material can have superior properties in terms of hardness, bonding, corrosion resistance and microstructure.

In an embodiment of the present invention, laser cladding technology is utilized in a method to deposit the cladding on and into the tapered surface 134 with the laser cladding tool/laser 152 and thereby metallurgically bond the cladding material 102 to the base material 176. The laser 152 may include using at least one of the following lasers; $CO_2$, YAG, Diode and fiber. A laser beam 156 is created by the laser tool 152 and consists of a column of light energy of similar wave length. These different types of lasers produce different wave lengths of light. These lasers each have their own unique characteristics, but all work well in the method described herein. The foregoing lasers are not meant to be limiting examples as other lasers can be employed.

As illustrated in FIG. 5, the laser 152 creates a shallow melt pool 166 of the base material. The cladding material 102 is comprised of particles 178 that are introduced into the melt pool 166 in powder form. The energy from the laser 152 subsequently melts binding materials of the cladding material 102. After solidification of the melt pool 166 a dilution zone 170 remains wherein true metallurgical bond affixing the particles 178 of the clad material 102 and the base material 176 remains under and a deposition zone 168 comprising only the laser clad material 102. (FIG. 6) Preferably the dilution zone 170 has a dilution zone thickness 171 that is less than 0.5 millimeters and more preferably less than 0.13 millimeters thick.

Typically the hard/wear resistant laser clad material 102 referred to in various embodiments of the invention is material composed of a medium to high percentage of hard particles. These hard particles can be: Tungsten Carbide, Titanium Carbide, Chrome Carbide, Iron Carbide, Diamond, Ceramics, or any other high hardness particles in the range of HV 1200-2500 (Vickers scale hardness). The high hardness particles are then bonded and held in place to the base material through the metallurgical bond. In the alternative to carbides, powders of various metal alloys or other amorphous materials may be laser clad or otherwise deposited according to embodiments of the present invention. Carbide alternatives as envisioned or discloses in U.S. Pat. No. 6,887,586 or U.S. RE 29,989 (see also U.S. Pat. No. 3,871,836), the entire teachings and disclosures of which are incorporated herein by reference.

As discussed above, when the clad material 102 is deposited into the base material 176 of the tapered surface 134 it forms the deposition zone 168 over the dilution zone 170. The deposition zone 168 (which is primarily particles and greater than 50% particles) formed of the laser clad material 102 forms a material bead 172 that extends normal to the surface of the base material and continuously around the first serrated cutting edge 110, the cutting edge 138 and the second serrated cutting edge 112. Preferably, the material bead 172 has an average thickness 173 between 0.1 millimeters and 0.4 millimeters and more preferably between 0.2 and 0.3 millimeters.

The dilution zone 170 contains base material 176 intermixed with particles 178 of the clad material 102 but may be 50% or more base material. The particles 178 of the clad material 102 are of a second hardness greater than the first hardness of the base material 176. The particles 178 of the clad material 102 preferably have an average size of between 40 µm and 250 µm and more preferably between 44 µm and 105 µm.

Preferably the dilution zone 170 has a dilution zone thickness 171 that is less than 0.51 millimeters and more preferably less than 0.13 millimeters thick. These areas provide the advantage of strong bonding and minimized distortion of the base material 176 that result in the advantage of less or no post cladding machining and processing to correct distortion than other known process.

The deposition zone 168 and the dilution zone 170 provide the advantage of strong bonding and minimized distortion of the base material 176 and thus further results in the advantage of less or no post cladding machining and processing to correct distortion that is typical in other processes that attempt to provide a hard and sharp cutting edge. Although, at the completion of the cladding process the sickle section 100 may be further hardened via induction hardening or the sickle section 100 may undergo quench and temper or austemper.

Figure 7:
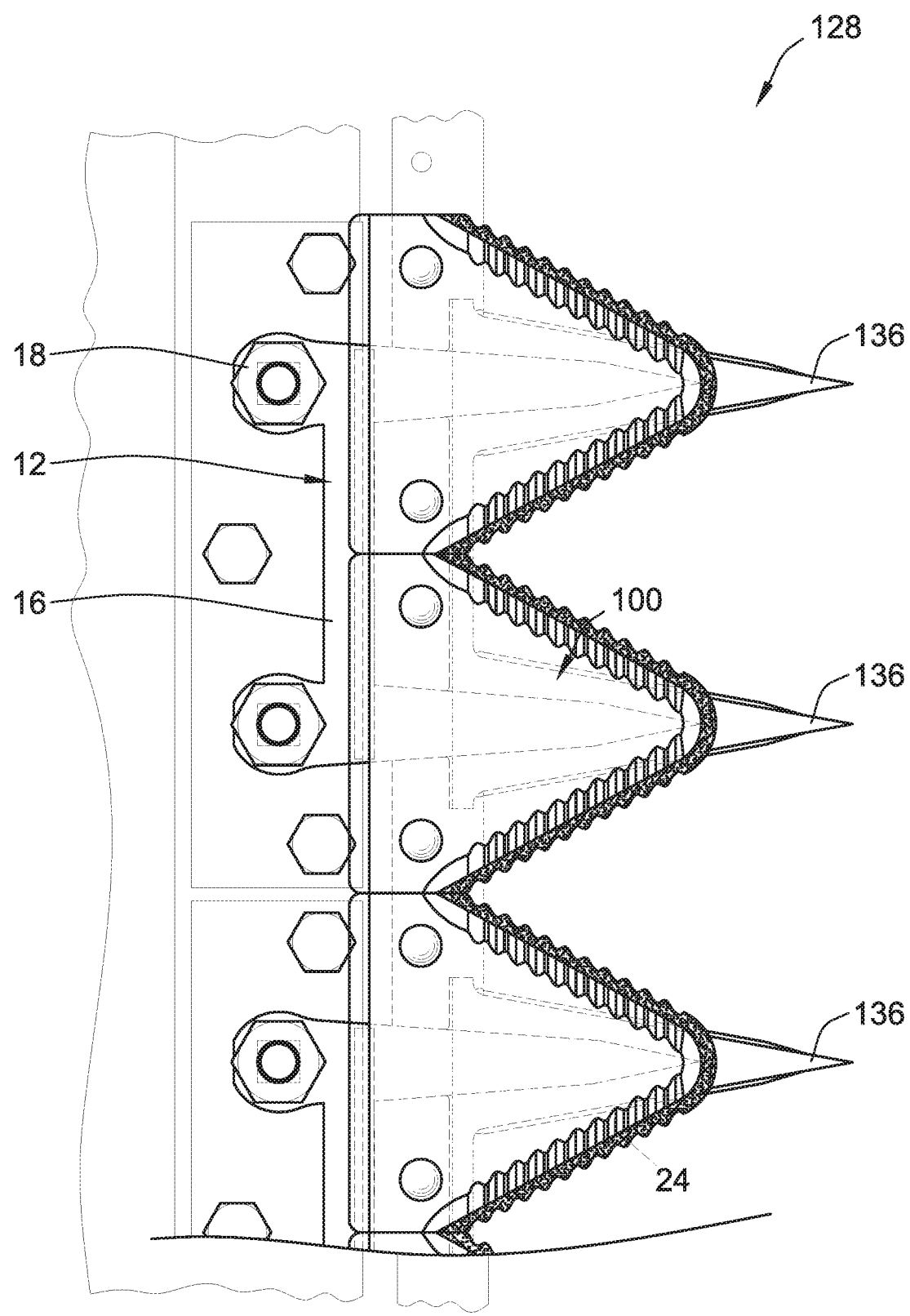
FIG. 7 is a schematic illustration of sickle sections of FIG. 2 in a sickle bar assembly.

FIG. 7 illustrates a plurality of the sickle cutting sections 100 as heretofore described in the various embodiments attached to a knife back 126 so as to be configured to reciprocate within the knife guards 136. The sickle cutting sections 100 having their bottom surfaces 120 that are free of clad and act as bearing surfaces that bear against the knife guards 136.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A sickle cutting section, comprising:
a plate comprising a base material having a first hardness, the plate extending forwardly from a mounting portion to a front tip;
a serrated cutting edge extending at least partially between the front tip and the mounting portion;
a clad material of a second hardness harder than the first hardness, the clad material deposited along the base material at least partially along the serrated cutting edge;
wherein the serrated cutting edge is formed along a bottom surface of the plate and extends along a tapered surface of the base material, the tapered surface extending inwardly from the bottom surface to a top surface of the plate; the clad material deposited along the base material at least partially along the tapered surface.

2. The sickle cutting section of claim 1, wherein the clad material is deposited into the base material forming a melt pool of the clad material and base material that at solidification comprises a dilution zone comprising a portion of base material intermixed with particles of the clad material.

3. The sickle cutting section of claim 2, wherein the dilution zone is less than 0.13 mm.

4. The sickle cutting section of claim 3, wherein a deposition zone comprising particles of the clad material clad particles is formed over of the dilution zone.

5. The sickle cutting section of claim 1, wherein the clad material comprises particles having an average size of between 40 and 250 μm.

6. The sickle cutting section of claim 1, wherein the clad material forms a bead having an average thickness of between 0.1 and 0.4 millimeter extending normal to a surface of the base material, and wherein the plate comprises a plate thickness of between 1 and 5 millimeters.

7. The sickle cutting section of claim 1, wherein the serrated cutting edge comprises a plurality of serrations defining a plurality recesses and tips, each of the recesses being disposed between adjacent tips, wherein 8 or fewer serrations per 2.5 cm are provided as the serrated cutting edges extend from the mounting portion toward the front tip.

8. The sickle cutting section of claim 7, wherein 6 or fewer serrations per 2.5 cm provided, and wherein the clad material forms a bead having an average thickness of between 0.2 and 0.3 millimeter extending normal to a surface of the base material, and wherein the plate comprises a plate thickness of between 1 and 5 millimeters.

9. The sickle cutting section of claim 7, wherein the recesses extend greater than 3 millimeters between adjacent tips and have a radius of curvature that is greater than 0.13 cm.

10. The sickle cutting section of claim 7, wherein each of the tips comprise a flattened region and extend between adjacent recesses at least 1.0 millimeter.

11. The sickle cutting section of claim 1, wherein the plate comprises a top surface, a bottom surface, with a plate thickness defined between the top surface and the bottom surface, a wedge portion extending toward the front tip from the mounting portion, the serrated cutting edge including a first serrated cutting edge along a first side of the wedge portion and a second serrated cutting edge along a second side of the wedge portion, wherein the serrated cutting edge is formed along the bottom surface and extends along a tapered surface extending inwardly from the bottom surface to the top surface, the bottom surface providing a bearing surface suitable for supporting linear reciprocating movement, and wherein the clad material is deposited along the tapered surface.

12. The sickle cutting section of claim 11, wherein the bottom surface is free of the clad material.

13. The sickle cutting section of claim 11, wherein the clad material is in the form of a bead extending along a limited portion of the tapered surface, wherein the tapered surface comprises a region free of the clad material at a location between the bead and the top surface.

14. The sickle cutting section of claim 1, wherein the clad material comprises a laid bead of laser cladding, comprising at least one of the following materials: tungsten carbide, titanium carbide, iron carbide, diamond, ceramic, and other material having a Vickers scale hardness between HV 1200-2500.

15. The sickle cutting section of claim 11, wherein the tapered surface extends along the frontal tip, the frontal tip being rounded and forming a cutting edge that connects the first and second serrated cutting edges to form an overall continuous cutting edge around the wedge portion, and wherein the clad material is deposited on the frontal tip and is continuous around the overall continuous cutting edge.

16. The sickle cutting section of claim 11, wherein the sickle cutting section has a first lateral dimension of between 6.4 and 8.9 cm, a second lateral dimension of between 6.4 and 8.9 cm, and a thickness of between 2 and 5 millimeters.

17. A method of making the sickle cutting section of claim 1, comprising:
melting the base material with a laser to form a melt pool;
depositing a stream of particles of the clad material into the melt pool; and
solidifying the melt pool to affix the particles of the clad material.

18. The method of 17, further comprising at least one of the following: induction hardening of the serrated cutting; quenching and tempering the sickle cutting section; austempering the sickle cutting section.

19. A sickle bar assembly comprising a plurality of the sickle cutting section as in claim 11, wherein the sickle sections are attached to a knife back and reciprocate within knife guards, the bearing surface bearing against the knife guards and wherein the clad material does not bear against the knife guards.

20. The sickle cutting section of claim 1, wherein the tapered surface extends along the frontal tip, the frontal tip being rounded with a radius of curvature of between 0.7 and 1.8 centimeters and forming a cutting edge that connects the first and second serrated cutting edges to form an overall continuous cutting edge around the wedge portion, and wherein the clad material is deposited on the frontal tip and is continuous around the overall continuous cutting edge.

21. The sickle cutting section of claim 1, wherein the tapered surface forms an angle with the bottom surface that is between 21 and 25 degrees.

22. The sickle cutting section of claim 1, wherein the cladding extends lengthwise along the serrated cutting edge over the tapered surface with a shorter width of the cladding extending transverse to the cutting edge.

23. The sickle cutting section of claim 1, wherein the cladding is only along a top side of the plate above the cutting edge, the bottom side being free of cladding.

* * * * *